Dec. 20, 1966     R. J. BRODD     3,293,079
THERMOCELL

Filed Aug. 20, 1962     2 Sheets-Sheet 1

RALPH J. BRODD
INVENTOR.

BY H.C. Goldwire
AGENT

Dec. 20, 1966 R. J. BRODD 3,293,079
THERMOCELL
Filed Aug. 20, 1962 2 Sheets-Sheet 1

RALPH J. BRODD
INVENTOR.

BY J. H. C. Goldwire
AGENT

United States Patent Office 3,293,079
Patented Dec. 20, 1966

3,293,079
THERMOCELL
Ralph J. Brodd, Dallas, Tex., assignor to Ling-Temco-Vought, Inc., Dallas, Tex., a corporation of Delaware
Filed Aug. 20, 1962, Ser. No. 217,950
6 Claims. (Cl. 136—86)

This invention relates to electrical cells and more particularly to an improved thermocell.

A "thermocell" is a device having spaced electrodes both made of the same material and mutually contacted by an electrolyte. A "thermopotential" is the E.M.F. which is produced across the electrodes when a thermal gradient is caused to exist between them.

The thermopotential of a thermocell is a special case of the thermoelectric effect associated with hot- and cold-junction contacts between dissimilar, conductive materials (for example, between dissimilar metals as in a thermocouple). In a thermocell, the electrodes may be taken as representing one conductor and the electrolyte the other conductor of a thermoelectric device, the two electrode-electrolyte interfaces being the hot and cold junctions. One interface, of course, is heated while the other is maintained at a lower temperature.

An important difference exists, however, between thermocouples and thermocells. In a thermocouple, only electrons flow in the circuit, and there is no net transfer of material from one electrode to the other. In a thermocell, matter of one electrode is transferred, by a process including ionic migration through the electrolyte, to the other electrode. As a result, the electrode life, and therefore the useful life of the cell, is limited.

It is an object of the present invention to provide a thermocell, suitable for use in a high-temperature environment, in which the useful life of the cell is in no way diminished by electrode consumption in the electrochemical reaction or reactions producing electrical power.

Other objects and advantages will be evident from the specification and claims and from the accompanying drawing illustrative of the invention.

In the drawing,

FIGURE 3 is a portion of a view similar to FIGURE 2 and showing an alternative placing of the heating and cooling means;

FIGURE 4 is a view similar to FIGURE 3 and showing another placing of the heating and cooling means; and FIGURE 5 is a sectional plan view of another embodiment of the invention.

Figure 1:
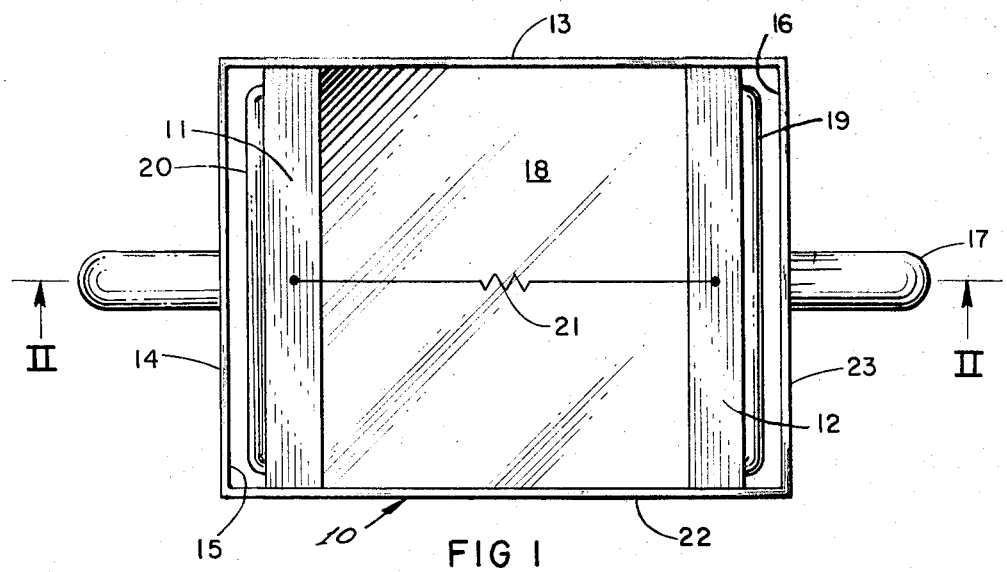
FIGURE 1 is a diagrammatic, plan view of a thermocell according to the invention, the upper wall being omitted for showing the thermocell interior.
Figure 2:
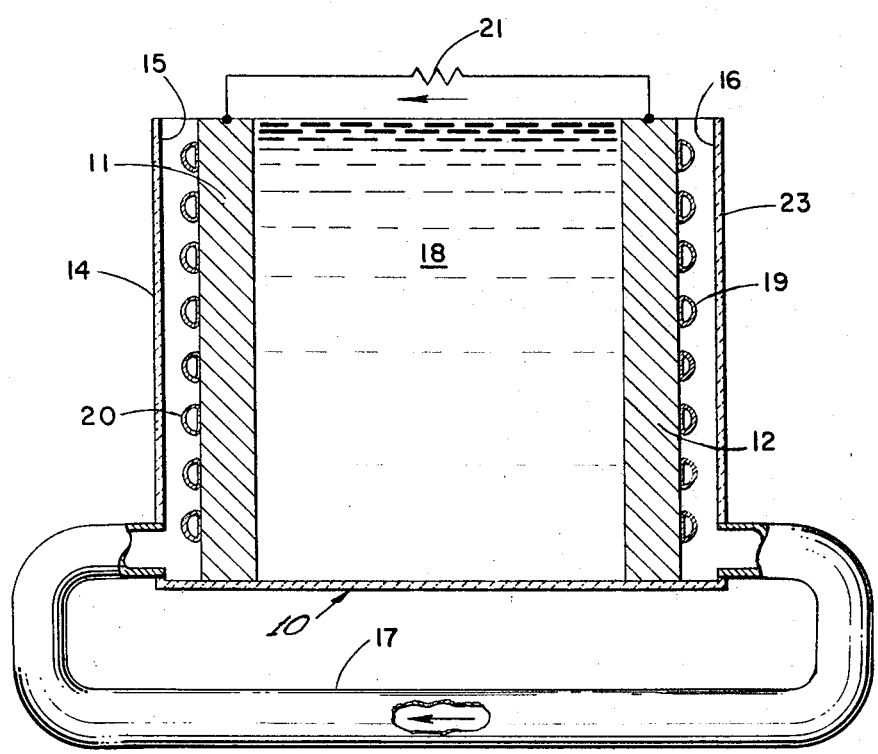
FIGURE 2 is a sectional view taken as at line II—II of FIGURE 1.
Figure 1:
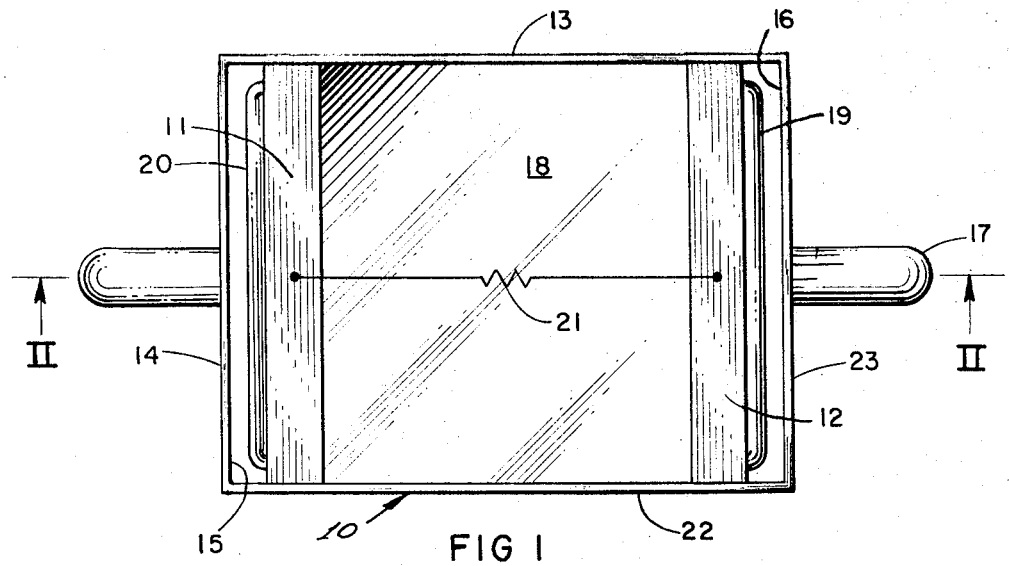
Figure 2:
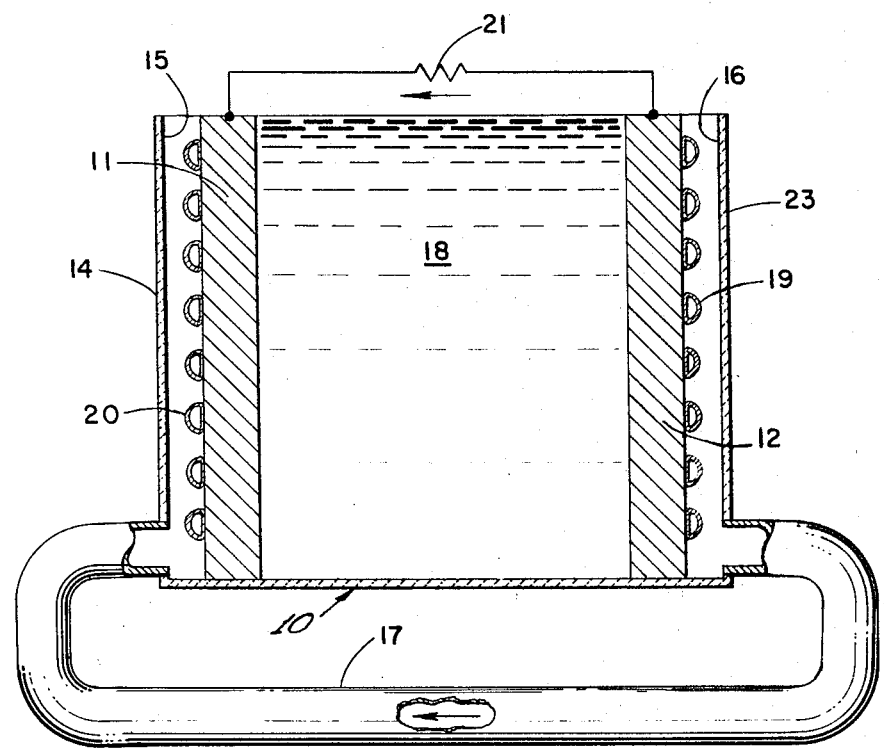

With initial reference to FIGURES 1 and 2, the thermocell comprises a compartment 10 having spaced first and second walls 11, 12 made of a porous, electrically conductive material and constituting a pair of electron collectors which operate, as will be seen, in conjunction with gaseous electrodes of the device. The collectors 11, 12 are of inert material, by which is meant that they are not chemically reactive with the gas and electrolyte (to be described) or any other contacting component of the device. Examples of suitable porous materials for the collectors 11, 12, depending on the temperatures which they must withstand, include carbon, graphite, and sintered, non-corrosive metals such as gold, etc. An additional pair of spaced walls 13, 22 connect the collectors 11, 12 and complete the enclosure 10; and these walls 13, 22 preferably are made of a high-temperature resistant, dielectric material (for example, a nonconductive ceramic) which electrically isolates the collectors 11, 12.

At the first collector 11, continuations of the compartment walls 13, 22 are combined with an outer wall 14, the latter being spaced outwardly of the compartment from the associated collector 11, to form a first manifold 15. A similar, second manifold 16 is associated with the other collector 12. In the embodiment described, each collector 11, 12 thus serves as a wall in common between the compartment 10 and an associated manifold 15 or 16. Communication between each manifold 15, 16 and the interior of the compartment 10 is restricted to communication through the pores of the two collectors 11, 12, the inner faces of the collectors being directed toward the compartment interior and the manifolds 15, 16 being mounted in covering relation to the collector outer faces, with which the interiors of the manifolds communicate.

The means providing communication between the manifolds 15, 16 preferably is a conduit 17 which connects the first manifold 15 into the second manifold 16. Filling the communication-providing means 17 and manifolds 15, 16 and permeating the collectors 11, 12 is a gas such as one of the halogens, oxygen, carbon monoxide, or carbon dioxide. The gas freely enters into the pores of the collectors 11, 12 and passes through the latter to the interface between the collectors and the electrolyte, described below.

As employed herein, the term "electrolyte" is not restricted to a liquid substance but refers to any substance in which there is ionic conduction. The electrolyte 18 is fused, i.e. it is molten, or exists in a solid body which once has been molten or sintered. Examples include a molten or solid, fused body which lies in contact with and is contained between the collectors 11, 12 and is made, for example, of a halide salt, an oxide, a carbonate, etc. In any particular case, the electrolyte 18 is always a reaction product of the gas employed. Thus, where the gas is chlorine, the electrolyte may be the potassium, sodium, lithium or other salt of the gas. Where the gas is oxygen, the electrolyte is an ionically conductive oxide. A carbonate (for example, sodium carbonate) is employed where the gas is carbon monoxide and/or carbon dioxide. Contained in the compartment 10 between the collectors 11, 12, the electrolyte 18 is prevented, even though molten, from passing into the manifolds 15, 16 by the collectors 11, 12, the porosity of the latter fully allowing the gas to come into contact with the electrolyte 18 through the collectors but being so fine as to preclude percolation of the electrolyte 18 into the manifolds 15, 16. Where the thermocell is intended to operate with the electrolyte 18 in solid condition, it is preferable that the electrolyte be melted within the compartment, then allowed to solidify, in order that the faces of the electrolyte 18 will make intimate contact with the inner faces of the collectors 11, 12 and prevent entry of the gas into the compartment 10 through the collectors. Alternatively, the collectors 11, 12 may be sintered in place on a solid, fused electrolyte body.

The means for maintaining a temperature gradient between the collectors 11, 12, and hence between the two gas-to-electrolyte interfaces, comprises means for heating one of the collectors 11 or 12 and for cooling the other. In the specific example, the means for heating one of the collectors comprises spaced tubes 19 which pass through the second manifold 16 and lie in heat-exchanging, contacting relation with the outer face of the second collector 12; through the tubes 19 is circulated a hot fluid (for example, a molten metal) heated by, for example, an atomic reactor. Similar tubes 20 passing through the first manifold 15 and similarly related to the first collector 11 contain a circulating, cooler fluid which keeps the first collector 11 at a temperature well below that of the second collector 12. Other locations, of course, are possible for the heating and cooling means; for example, in FIGURE 4, the tubes 19A, 20A extend through the interior of the collectors 11A, 12A. In FIGURE 3, on the other hand, either one or the other of the two sets of tubes (for example, the heating means tubes 19B) extend through the collector 12B, while the other tubes 20 lie within the manifold against the other collector 11. Still other arrangements are possible within the relationship wherein the heating and cooling means lie between the outer walls 14, 23 of the manifolds 15, 16 and in heat-exchanging relationship with respective collectors.

An electrical load 21 (FIGURES 1, 2), of whatever nature desired, is connected between the collectors 15, 16. It will of course be understood that a plurality of the cells such as described herein may be connected in series or parallel as required for obtaining desired voltage and current values.

The embodiment of the invention shown in FIGURE 5 includes a compartment 10A having spaced, confronting outer walls 14A, 23A connected by electrically insulating side walls 13A, 22A. Associated with the outer wall 14A is the first collector 11C which is disposed against the wall 14A interiorly of the compartment 10A; the material of the collector 11C is as described before. The outer walls 14A, 23A and side walls 13A, 22A are extended and formed to provide, at one end of the compartment, a first gas-containing manifold 15A which covers at least a substantial portion of the periphery of the first collector 11C, with whose peripheral surface the interior of the manifold 15A communicates. The collector 11C thus serves as a wall in common between the manifold 15A and the compartment 10A. Similarly, a second gas-containing manifold 16A and a second collector 12C are supplied at the other end of the compartment 10A. Against the outer wall 14A is constructed a first heat-exchanging manifold 24 provided with inlet and outlet tubes 25, 26 carrying, for example, a first, cold fluid, and a second heat-exchanging manifold 27 similarly is provided against the other outer wall 23A and supplied with tubes 28, 29 for the circulation of a second, hot fluid. A solid material 18A which has been fused is contained in the compartment 10A and sandwiched between the collectors 11C, 12C; this material, which serves as an electrolyte, is a salt or ionically conductive oxide. As before, a conduit 17A connects the two manifolds 15A, 16A, and an electrical load 21A may be connected between the collectors 11C, 12C. A gas filling the manifolds 11C, 12C and conduit 17A and permeating the collectors 15A, 16A is provided; and the electrolyte 18A is a reaction product of the gas. As in all forms of the invention, the collectors 11C, 12C are electrically insulated from each other except through the electrolyte 18A and electrical load 21A. A zirconium-calcium oxide mixture which has been sintered is suitable for collectors 11C, 12C where the electrolyte 18A is a metallic oxide.

When the second collector 12 (FIGURE 1) is caused to stand at a higher temperature than the first collector 11, electrochemical changes occur at the interface between the electrolyte 18 (for example, molten lithium chloride) and the gas (for example, chlorine) permeating the second collector 12. Chlorine ions of the electrolyte 18 shed their acquired electrons and hence enter the gaseous state; the freed electrons are accepted by the collector 12, through whose pores the evolved gas penetrates to enter the second manifold 16. The electrons from collector 12 pass through the electrical load 21 to the first collector 11 and, at the interface between the gas from the first manifold 15 and the electrolyte 18, are acquired by chlorine atoms to produce chlorine ions. The ions produced at the cold first collector 11 migrate through the electrolyte 18 to the second collector 12, where they are returned to elemental state by the loss of electrons. Chlorine gas thus serves as the electrodes at each end of the cell, and, while bing produced at one end of the cell, is equally consumed at the other. Gas produced at the hot collector 12 is transported through the conduit 17 to the cold, gas-consuming electrode at collector 11; thus, the cell operates indefinitely without any tendency whatever to depletion of the cold electrode. It is of advantage in all applications that the electrodes never need be renewed, and this is of special value and convenience where the heat source is an atomic reactor. Meanwhile, the cell may readily be operated in a high-temperature environment, its operating temperature being limited only by the capacities of the materials of the walls, heat-exchanging tubes, etc. employed.

The operation of the device of FIGURE 5 is similar to that of FIGURES 1 and 2. Channels 30, 31 formed in the collectors 11C, 12C and connecting with the manifolds 15A, 16A allow for ready passage of the gas from the hot collector 12C into the manifold 16A and from the other manifold 15A into the cold collector 11C.

While only one embodiment of the invention, together with modifications thereof, has been described in detail herein and shown in the accompanying drawing, it will be evident that various further modifications are possible in the arrangement and construction of its components without departing from the scope of the invention.

I claim:
1. A thermocell comprising:
   a compartment having first and second walls made of a porous, inert, electrically conductive material and constituting a spaced pair of collectors, and a spaced pair of walls connecting and electrically isolating the collectors;
   first and second manifolds respectively associated with the first and second collectors, each of said manifolds having an outer wall spaced outwardly of the compartment from the associated collector, each of the collectors serving as a wall in common between the compartment and the associated manifold;
   means providing communication between the manifolds;
   a gas permeating the collectors and filling the manifolds and communication-providing means;
   a fused salt electrolyte in contact with the collectors and contained in the compartment between the collectors, the salt being a salt of the gas;
   means for heating one of the collectors, said means lying between the outer walls of the manifolds and in contact with one of the collectors;
   and means for cooling the other of the collectors, the last-named means lying between the outer walls of the manifolds and in contact with the other of the collectors.

2. The thermocell of claim 1, at least the means for heating one of the collectors lying within a respective one of the manifolds.

3. The thermocell of claim 1, at least the means for cooling the other of the collectors lying within a respective one of the manifolds.

4. The thermocell of claim 1, at least the means for heating one of the collectors extending through said one of the collectors.

5. The thermocell of claim 1, at least the means for cooling the other of the collectors passing through said other of the collectors.

6. A thermocell comprising:
   a compartment having a spaced, confronting pair of end walls;
   first and second porous, inert, electrically conductive bodies disposed against respective ones of said end walls and lying interiorly of the compartment, each of said bodies constituting a collector, each of the collectors having a periphery;
   a first gas-containing manifold covering and having an interior communicating with at least a substantial portion of the periphery of the first collector, communication between the manifold and the interior of the compartment being restricted to communication through the pores of the first collector;

a second gas-containing manifold similarly related to the second collector and to the compartment;

a conduit connecting the gas-containing manifolds;

a first heat-exchanging manifold positioned against the respective one of said end walls against which the first of said conductive bodies is disposed and a second heat-exchanging manifold positioned against the respective one of said end walls against which the second of said conductive bodies is disposed;

a fused, ionically conductive material contacting the collectors and enclosed in the compartment;

a gas permeating the collectors and filling the gas-containing manifolds and conduit, the ionically conductive material being a reaction product of the gas;

means for circulating a first fluid through one of the heat-exchanging manifolds;

and means for circulating through the other heat-exchanging manifold a fluid of higher temperature than the first fluid.

References Cited by the Examiner

UNITED STATES PATENTS

| | | | |
|---|---|---|---|
| 736,016 | 8/1903 | Reid | 136—86 |
| 2,890,259 | 6/1959 | Weininger | 136—86 |

OTHER REFERENCES

Holtan, "J. Chem. Phys.," vol. 19, No. 5, pp. 519–525, May 1951.

Weininger, "Abstract No. 37," "Extended Abstracts of Battery Division," vol. 8, The Electrochemical Society Fall Meeting, Sept. 30–Oct. 3, 1963, pp. 123 and 124.

ALLEN B. CURTIS, *Primary Examiner.*

JOHN H. MACK, WINSTON A. DOUGLAS,
*Examiners.*

A. M. BEKELMAN, *Assistant Examiner.*